Figure 1:
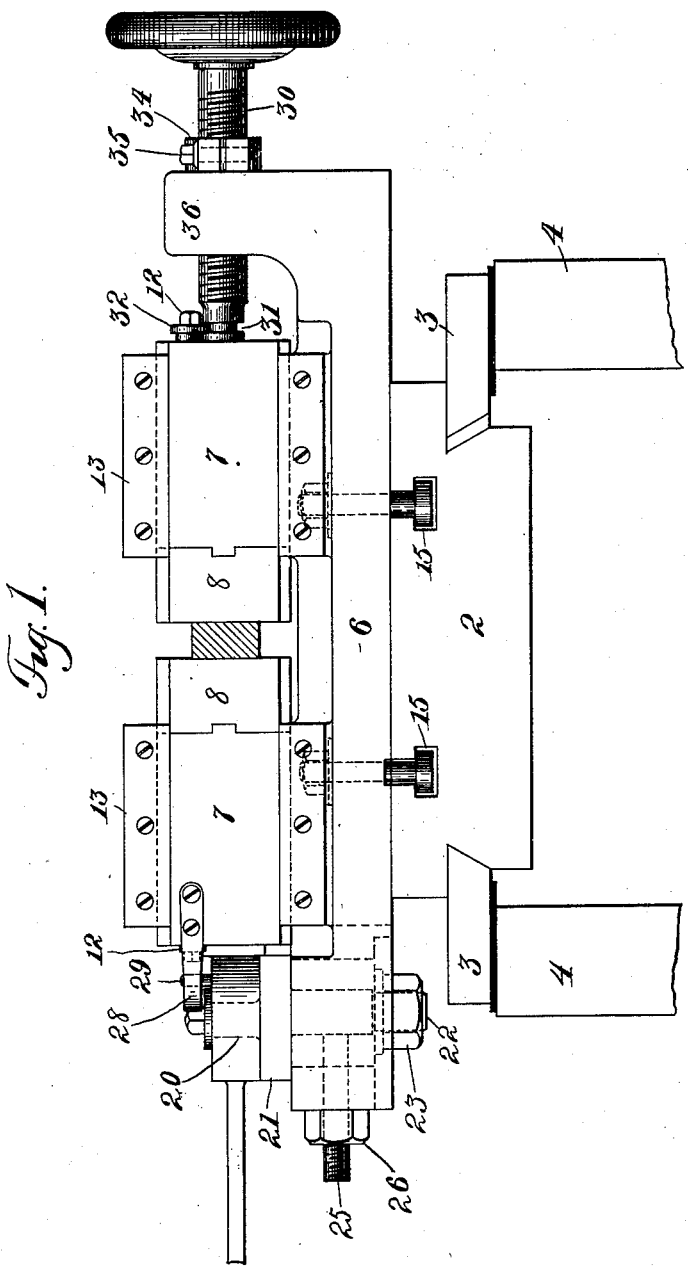

No. 735,821. PATENTED AUG. 11, 1903.
A. F. RIETZEL.
CLAMPING DEVICE FOR ELECTRIC METAL WORKING APPARATUS.
APPLICATION FILED JULY 28, 1902.
NO MODEL. 3 SHEETS—SHEET 1.

WITNESSES:
INVENTOR
Adolph F. Rietzel
BY
ATTORNEY

No. 735,821. PATENTED AUG. 11, 1903.
A. F. RIETZEL.
CLAMPING DEVICE FOR ELECTRIC METAL WORKING APPARATUS.
APPLICATION FILED JULY 28, 1902.
NO MODEL. 3 SHEETS—SHEET 2.

WITNESSES:
H. C. Townsend Jr.
E. L. Lawler.

INVENTOR
Adolph. F. Rietzel.
BY
H. C. Townsend
ATTORNEY

No. 735,821. PATENTED AUG. 11, 1903.
A. F. RIETZEL.
CLAMPING DEVICE FOR ELECTRIC METAL WORKING APPARATUS.
APPLICATION FILED JULY 28, 1902.
NO MODEL. 3 SHEETS—SHEET 3.

WITNESSES:

INVENTOR
Adolph F. Rietzel.
BY
ATTORNEY

No. 735,821. Patented August 11, 1903.

UNITED STATES PATENT OFFICE.

ADOLPH F. RIETZEL, OF LYNN, MASSACHUSETTS, ASSIGNOR TO THOMSON ELECTRIC WELDING COMPANY, OF LYNN, MASSACHUSETTS, A CORPORATION OF MAINE.

CLAMPING DEVICE FOR ELECTRIC METAL-WORKING APPARATUS.

SPECIFICATION forming part of Letters Patent No. 735,821, dated August 11, 1903.

Application filed July 28, 1902. Serial No. 117,271. (No model.)

*To all whom it may concern:*

Be it known that I, ADOLPH F. RIETZEL, a citizen of the United States, and a resident of Lynn, in the county of Essex and State of Massachusetts, have invented certain new and useful Improvements in Clamping Devices for Electric Metal-Working Apparatus, of which the following is a specification.

My invention relates to clamping devices for electric metal-working apparatus, and is designed more particularly to improve the construction and operation of the clamping devices employed for electric welding-machines, although the devices hereinafter described may be also employed on machines organized or adapted for use in carrying on other kinds of metal-working operations.

The successful operation of electric welding-machines depends almost wholly upon the construction of the clamping devices which have to be adapted for various kinds of work and which must, moreover, be capable of holding the work tightly and be so constructed that the work may be quickly put in and taken from the clamps. They must also be strong enough to hold the work firmly in the jaws without slipping when the pressure is applied to complete the weld or perform other operations when the metal has been softened by the current to the required degree.

One of the principal objects of my present invention is to provide clamping devices especially suited for use with heavy work and readily adjustable for different classes or kinds of work.

The invention may be employed for clamping flat stock, straight pieces, angle-work, round stock, or other material to be welded or otherwise worked when electrically heated.

Another object of my invention is to provide for the application of a clamping-pressure to a very considerable portion of the pieces to be welded or worked, so as to provide large areas through which current may be fed to the work, while at the same time giving ready access to the clamping devices and permitting the work to be readily inserted or withdrawn.

Another object of the invention is to bring the line of clamping-pressure upon the work as near as possible to the line of heating or welding.

Another purpose of the invention is to facilitate the operation of clamping and unclamping the work in those cases where the clamping-jaw is operated upon by a cam.

In the preferred manner of carrying out my invention I mount the two clamping-jaws which hold the work at one side of the line of heating in such manner that the pressure shall be applied in a horizontal line or line substantially parallel to the bed of the machine, thus leaving the opening between the jaws free or clear from above, and I combine with one of said jaws a suitable adjustable screw which is set or adjusted for different sizes of work, and with the other jaw I combine a cam-lever which is manipulated during the operation of the machine for carrying on a certain class of work or work of a certain size with reference to which the opposite jaw is adjusted by means of a screw, the latter adjustment being practically a slow or fixed adjustment and the former or that which is carried on by means of the cam being the temporary or quick adjustment used in clamping and unclamping the work.

Another feature of my invention relates to means for setting or adjusting the jaw for different classes of work and for at the same time providing a means whereby the jaw may be secured to the jaw-carrying slide and may be readily removed to permit the substitution of jaws adapted for different kinds or forms of work.

My invention also consists in other details of construction and combination of parts, which will be hereinafter described, and all more particularly specified in the claims.

Figure 2:
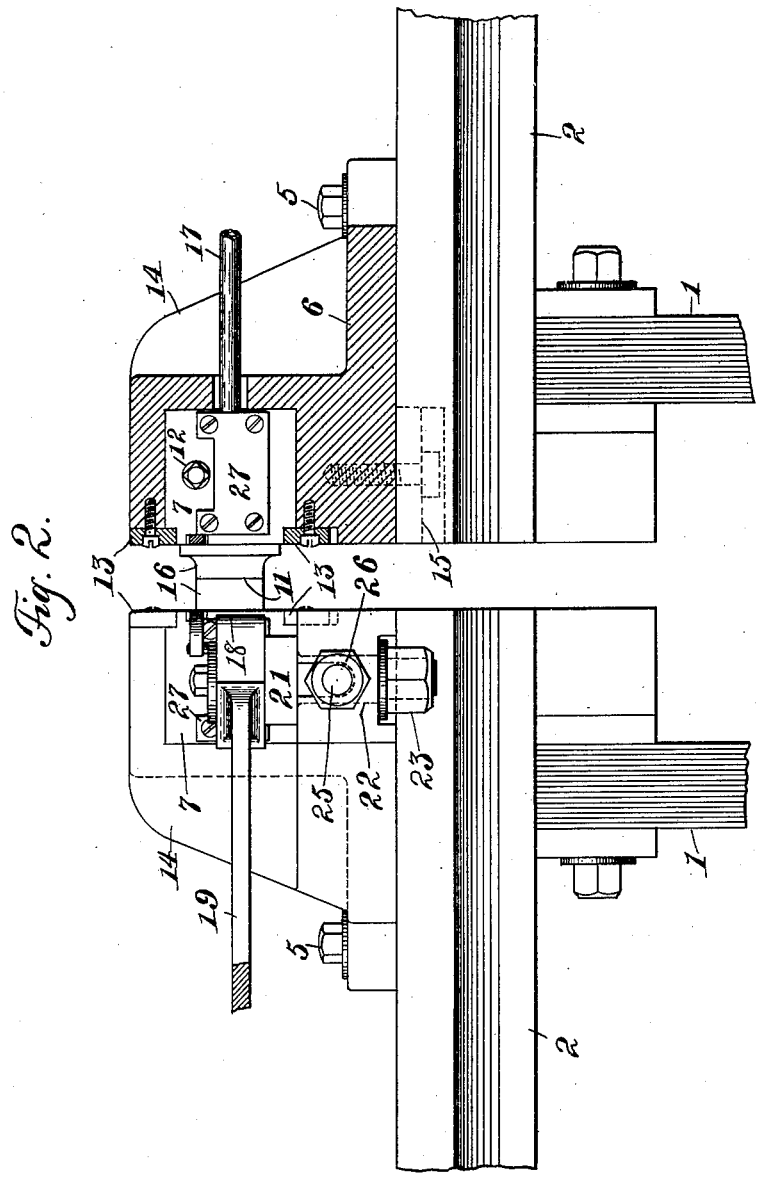
Figure 3:
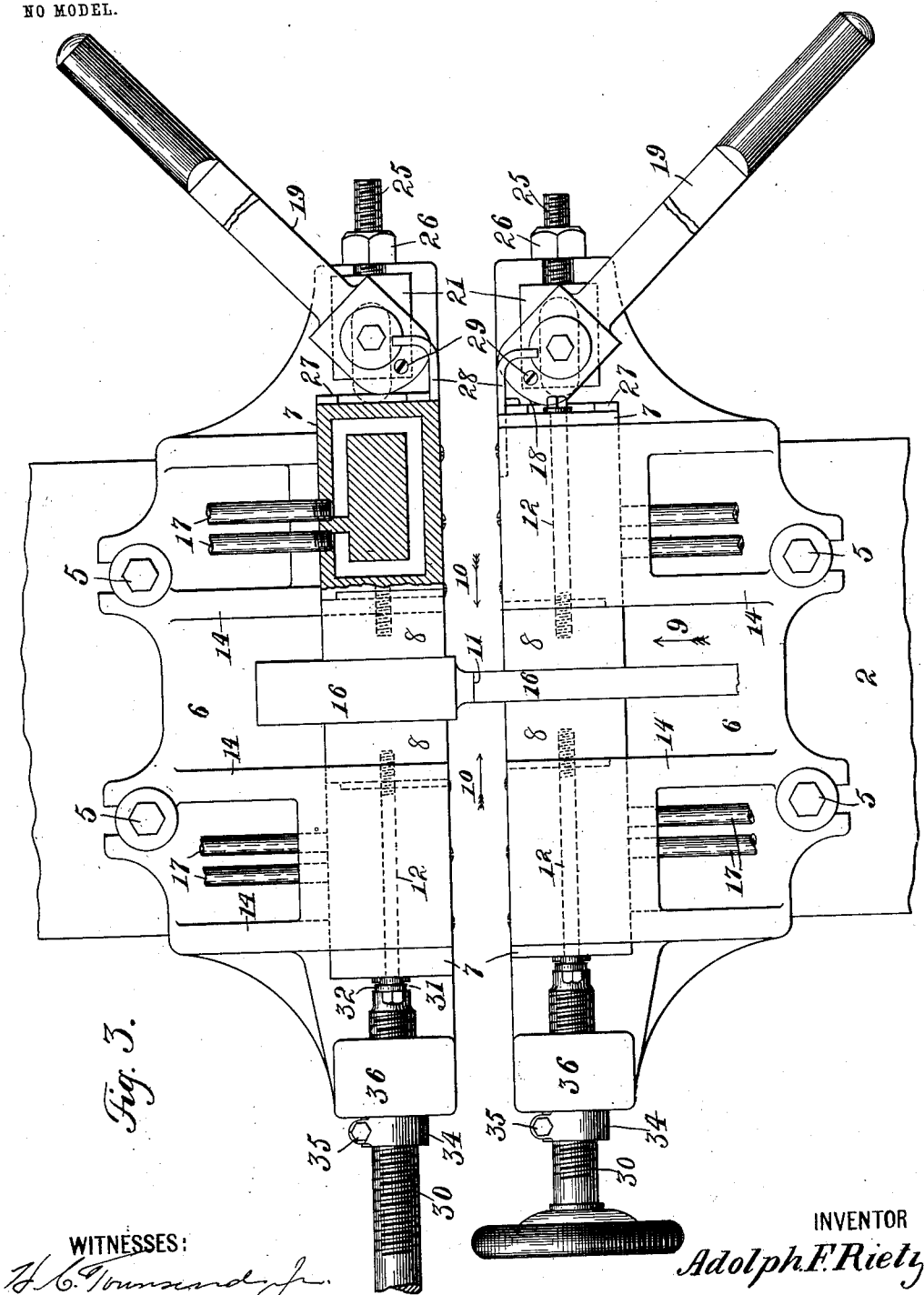

Referring to the accompanying drawings, Figure 1 is an end elevation of the parts of an electric welding apparatus embodying my invention. Fig. 2 is a front elevation of the parts, and Fig. 3 is a plan.

The terminals of any source of electricity suitable for supplying the heating-current are indicated by the numeral 1, while 2 indicates the platens of copper or other good conductor clamped to the terminals 1 and bearing, respectively, the sets of clamping devices by which the work is secured at opposite sides of the line of heating. The terminals 1 may be flexible or movable terminals constituting, if desired, the terminals of a low-tension secondary of a transformer, as well understood in the art, and one of the platens 2 is made adjustable to and from the other to apply pressure to the work when heated by the current, as well understood in the art. For this purpose said platen is mounted on guides 3, as shown in Fig. 1, which guides are secured upon or form a part of a frame or table 4 for the apparatus. The description of the clamping apparatus upon the platen 2, at one side of the machines, will suffice for that upon the other. Secured to said platen by suitable bolts 5, as shown, is casting 6, constituting a clamp-body frame or guide in which the slides carrying the clamping-jaws for one side of the work are housed and guided. This frame body or housing 6 may be of any desired form. It is provided with housings or guides for slides or blocks 7, adapted to slide in said housings in a line transverse to the line of pressure applied to the work when heated. This line of clamping-pressure is practically parallel to the plane of the platen or bed of the machine. The line of welding-pressure applied to the heated work is indicated by the arrow 9, Fig. 3, the line of clamping-pressure by the arrows 10 in said figure, while the line of heating, as in the case of an electric weld, is indicated at 11.

The slides 7 are preferably formed of gun-metal or some other good conducting material adapted also to provide good wearing-surfaces, and they are furnished at their end with copper clamping-jaws 8, secured thereto by the bolts 12, whose ends project at the rear of the slides.

The clamp bodies or frames 6, in which the slides 7 are guided, are open at the side nearest the line of heating, and the slides 7 are inserted into this housing from the sides nearest the said line of heating or welding. They are kept in place by the guide-plates 13, secured to the edge of the housing, as shown clearly in Fig. 1. This construction brings the line of pressure of the metal slide carrying the jaw as nearly up to the line of heating as is possible and is a decided advantage over that construction in which the housing would be opened from the rear or from the top to permit the insertion of the slide, since in the latter case there would be a wall of the housing or clamp frame or body between the slide and the line of heating.

14 indicates rearwardly-projecting ribs or buttresses extending from the clamp body or frame in a direction opposite to the line of welding pressure indicated by the arrow 9, for the purpose of stiffening the frame and preventing distortion under pressure applied to the work when heated.

The clamp body or frame carrying the two housings and jaw-bearing slides is adjustable as a whole to and from the line of heating by means of the clamp-bolts 5, which have their heads engaged in undercut guides or slots 15, as indicated in Fig. 3, and which run parallel to the line of welding pressure.

The two pieces of material to be welded are indicated by the numeral 16.

The pipes which supply a cooling medium to passages within the clamp block or guide 7 are indicated by the numeral 17. They extend rearwardly through slots or openings in the housing, as shown in Figs. 2 and 3.

One of the clamp-jaws is operated upon by a cam 18, secured to an operating-lever 19 and mounted upon a stud 20, rising from an adjustable block or support 21, from which depends the post 22, that passes down through a slot in an ear or horizontal extension of the clamp-body 6 and is provided with a clamping-nut 23. The axis of the slot is parallel to the line of pressure applied by the cam, and this construction permits an adjustment of the cam to accommodate the devices to different sizes of work. A finer adjustment may be secured by providing the stud or post 22 with an arm 25, extending rearwardly through the edge of the base-plate 6, as shown, and by applying to the screw-threaded end of said arm or stud 25 a suitable adjusting-nut 26, as shown in Fig. 1. Interposed between the working face of the cam and the end of the gun-metal slide 7 is a steel wear-plate 27, secured thereto by screws or bolts, as indicated in Figs. 2 and 3. This steel plate takes up the wear and prevents injury to the soft-metal slide by the action of the cam.

To facilitate the operation of the apparatus by quickly clearing the work from the clamping-jaws after the work is done, I provide the clamp and the operating-cam with means for positively withdrawing the clamp-bearing jaw or slide by the action of the operating-lever 19 when the movement of the same is reversed to relieve the jaw from the pressure applied by the cam. For this purpose I propose to mount upon the slide a suitable hook 28, whose end is arranged in position to be engaged by the pin 29, carried by the cam or lever, when the lever is thrown back to release said cam.

Other means or devices might be employed for causing the operating-lever and the cam and the jaw-bearing slide to interlock when the lever is reversed to free the work from the clamping-pressure.

The position of the jaw-bearing slide opposite that which is actuated by the cam is determined by means of an adjusting-screw 30, according to the size and character of work to be inserted in the machine. Said adjusting-screw engages with the jaw-bearing slide by a detachable connection of proper character, however, to impart a positive movement to said slide in both directions. For this purpose the screw may be provided on its ends with a circumferential groove 31, with which a suitable projection on the slide interlocks. The projection so engaged with the groove may conveniently be a flange 32 upon the end of the bolt 12, by which the copper jaw 8 is secured to the slide. This means of adjusting or fixing the position of one of the jaws for different classes or sizes of work is of decided advantage, as it permits the ready removal of the slide and attached jaw when desired and the replacement of the jaw by another for a different shape or size of work.

Where it is desirable to manipulate the jaw by the screw 30 to more thoroughly free the work from the jaws, some means should be provided for determining the exact position of the jaw when again set to position for a new piece of work. For this reason I provide for the screw an adjustable stop capable of being set permanently for a particular size of work being done and so arranged as to stop the movement of the parts when manipulated to move the jaw toward the work. Such an adjustable stop may conveniently consist of a nut 34, mounted upon the screw 30 on the outside of the post or standard 36, which rises from the body 6 and which is tapped to receive the screw 30. The clamping-screw 35, applied to the nut 34, which is a split nut, serves to clamp said nut in position upon the screw. In the operation of adjusting the screw 30 it is turned until the jaw 8 occupies the proper position for the class or kind of work to be done, after which stop-nut 34 is run up on the screw 30 until it abuts against the post 36, and it is then set by means of the clamp-bolt 35, so that when the screw 30 is turned back to withdraw the slide 7 the stop-nut 34 will retain its position on the screw and will limit the return movement, so as to bring the parts to rest in the preadjusted position. I do not limit myself to this particular kind of adjustment-stop for the adjusting-screw 30.

The invention claimed is—

1. In an electric metal-working apparatus, the combination substantially as described with the clamp body or frame, of a jaw-operating cam and an adjustable block or stud carrying said cam and mounted and adjustably guided on a horizontal extension from the base of said frame to permit the position of the cam to be varied for different sizes of work.

2. In an electric metal-working apparatus, the combination substantially as described with the clamp body or frame having a housing, a jaw-bearing slide guided therein, an actuating-cam mounted on the base of said clamp-bearing body or frame, and an adjustable block or stud carrying said cam and adjustable to and fro in the line of clamping-pressure.

3. In an electric metal-working apparatus, the combination with a jaw-bearing slide adapted to slide in a line transverse to the line of pressure applied to the work when heated, of a guide-housing carrying the same and open on the side next the line of heating, as and for the purpose described.

4. In an electric metal-working apparatus, the combination with a platen through which current is supplied to the work, of a clamp body or frame secured to said platen and provided with housings or guides for a pair of clamping-jaws adapted to slide in said housings in a line transverse to the line of pressure applied to the heated work and parallel to the bed of the apparatus.

5. In an electric metal-working apparatus, the combination with the platen through which current is supplied to the work, of a clamp body or frame adjustably attached thereto and adapted to be adjusted in a line parallel to the line of pressure applied to the work when heated, said clamp body or frame being provided with two housings or sets of guides each carrying a jaw-supporting slide sliding therein in a line transverse to the said line of pressure, and means mounted on said body or frame for adjusting or moving both of said slides to and from one another.

6. In an electric metal-working apparatus, the combination with a pair of clamping-jaws adapted to grasp the work at one side of the line of heating between them, of a pressure-cam connected to one of said jaws and adapted to apply pressure during the operation of the apparatus for a particular kind or class of work, and an adjusting-screw for setting the opposite slide-bearing jaw permanently for the particular size of work being done.

7. In an electric metal-working apparatus, the combination substantially as described, of a clamp body or frame forming a housing or guide opened on the side next the line of heating, and detachable guides or plates 13 for securing the slide in position and permitting its adjustment in a line transverse to the line of pressure applied to the work while heated.

8. In an electric metal-working apparatus, the combination with a pair of clamping-jaws, of an operating-cam for one of said jaws, an adjusting-screw for determining the position of the other jaw, and an adjustable stop-nut on said screw adapted to be set permanently for the particular size of work being done.

9. In an electric metal-working apparatus, the combination with a jaw-bearing slide or carrier, of an adjusting-screw connected therewith through devices adapted to give positive movement to said slide in both directions when the screw is turned, and an adjustable stop to limit the movement of the parts when the slide is adjusted toward the work.

10. In an electric metal-working apparatus, the combination substantially as described with a jaw-bearing slide, of an adjusting-screw, a post or standard tapped to receive said screw and rising from the base or body on which the slide is mounted, an adjustable nut on said screw, and means for clamping said nut upon the screw.

11. In an electric metal-working apparatus, the combination substantially as described, of a jaw-bearing slide or carrier, an adjustable clamping-jaw, a bolt securing the jaw to the carrier, and an adjusting-screw having a circumferential groove at its end engaged by the bolt.

12. In an electric metal-working apparatus, the combination with the jaw-bearing slide guided in a suitable housing or frame, of an adjusting-screw and devices for imparting positive movement from the screw to the slide in both directions, said devices being constructed as described to permit the withdrawal of the slide from its housing without disturbing the screw.

13. In an electric metal-working apparatus, the combination substantially as described with the jaw-bearing slide or carrier and the operating-cam for applying clamping-pressure, of a hook and pin, one upon the slide and the other upon the cam and arranged as described to positively withdraw the slide when the cam is thrown off to release the work from the clamping-pressure.

Signed at Lynn, in the county of Essex and State of Massachusetts, this 23d day of July, A. D. 1902.

ADOLPH F. RIETZEL.

Witnesses:
   GEO. W. N. CHADWELL,
   ERNEST G. MITCHELL.